United States Patent
Hwang

(10) Patent No.: US 11,453,081 B2
(45) Date of Patent: Sep. 27, 2022

(54) FLEXIBLE TIG WELDING TORCH

(71) Applicant: Won-Gyoo Hwang, Ulsan (KR)

(72) Inventor: Won-Gyoo Hwang, Ulsan (KR)

( * ) Notice: Subject to any disclaimer, the term of this patent is extended or adjusted under 35 U.S.C. 154(b) by 116 days.

(21) Appl. No.: 17/010,918

(22) Filed: Sep. 3, 2020

(65) Prior Publication Data

US 2021/0237192 A1   Aug. 5, 2021

(30) Foreign Application Priority Data

Feb. 4, 2020 (KR) .................. 10-2020-0012913

(51) Int. Cl.
*B23K 9/28* (2006.01)
*B23K 9/167* (2006.01)

(52) U.S. Cl.
CPC .............. *B23K 9/287* (2013.01); *B23K 9/167* (2013.01)

(58) Field of Classification Search
CPC ............................... B23K 9/282; B23K 9/287
USPC ............................................ 219/138, 145.32
See application file for complete search history.

(56) References Cited

U.S. PATENT DOCUMENTS

| | | | | |
|---|---|---|---|---|
| 3,836,747 A | * | 9/1974 | Wlos ...................... | B23K 9/291 174/46 |
| 4,403,136 A | * | 9/1983 | Colman ................. | B23K 9/291 219/137.31 |
| 4,568,813 A | * | 2/1986 | Andersen ............. | B23K 35/365 219/146.1 |
| 4,869,420 A | * | 9/1989 | Kessler, Jr. ........... | C04B 37/001 228/115 |
| 5,412,176 A | * | 5/1995 | Keenan .................... | B23K 9/32 219/137 R |
| 7,663,074 B2 | * | 2/2010 | Wells ....................... | B23K 9/32 219/137.31 |
| 2005/0072763 A1 | * | 4/2005 | Delgado ................ | B23K 9/296 219/137.62 |
| 2013/0200058 A1 | * | 8/2013 | Kachline ............. | B23K 9/1006 219/138 |
| 2013/0240496 A1 | * | 9/2013 | Kinder ..................... | B23K 9/24 219/138 |
| 2013/0264315 A1 | * | 10/2013 | Hung ..................... | B23K 9/164 219/136 |
| 2014/0110386 A1 | * | 4/2014 | Centner ................. | B23K 9/173 219/138 |

FOREIGN PATENT DOCUMENTS

| | | |
|---|---|---|
| KR | 20-0248916 Y1 | 11/2001 |
| KR | 10-2010-0102407 | 9/2010 |

* cited by examiner

*Primary Examiner* — Jimmy Chou
(74) *Attorney, Agent, or Firm* — Finch & Maloney PLLC

(57) ABSTRACT

Disclosed is a flexible TIG welding torch having a torch body for performing an angle adjustment of a torch head with respect to a torch handle, wherein the torch body includes: a multi-array spiral wires having both ends connected to the torch head and the torch handle; a first protective sleeve supported in contact with outer sides of the wires and organized as a mesh structure; a second protective sleeve laminated as a mesh structure on an outer side of the first protective sleeve, and bonded onto an inner surface of a clad body of the torch body; and an adhesive layer impregnated into the mesh structures of the first and second protective sleeves to fix the first and second protective sleeves to each other, and support compressive and tensile stresses formed in the first and second protective sleeves.

10 Claims, 4 Drawing Sheets

[FIG 1]
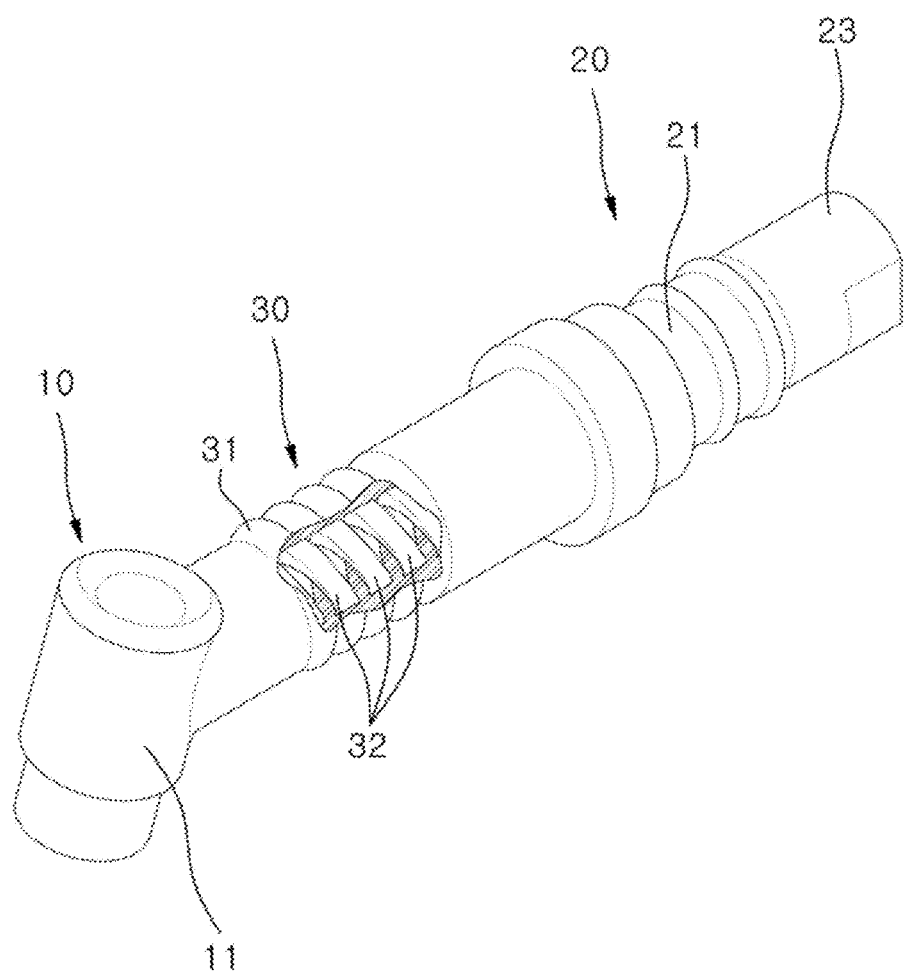

[FIG 2]
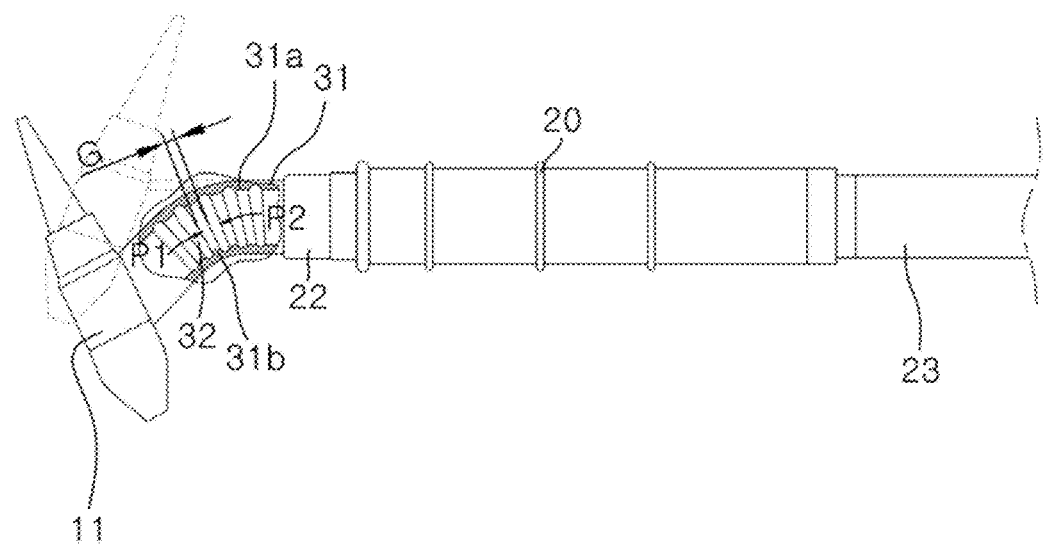
[FIG 3]
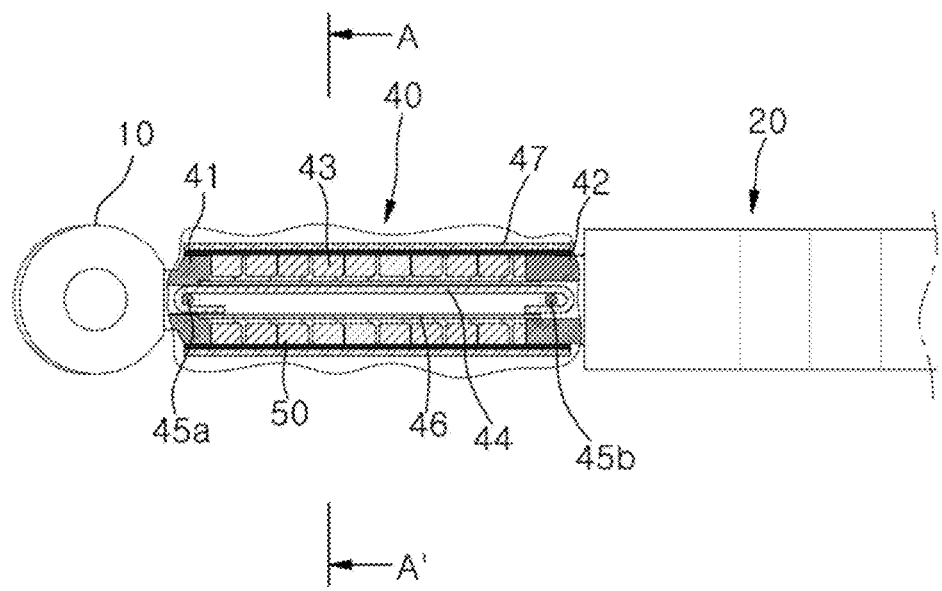

[FIG 4]
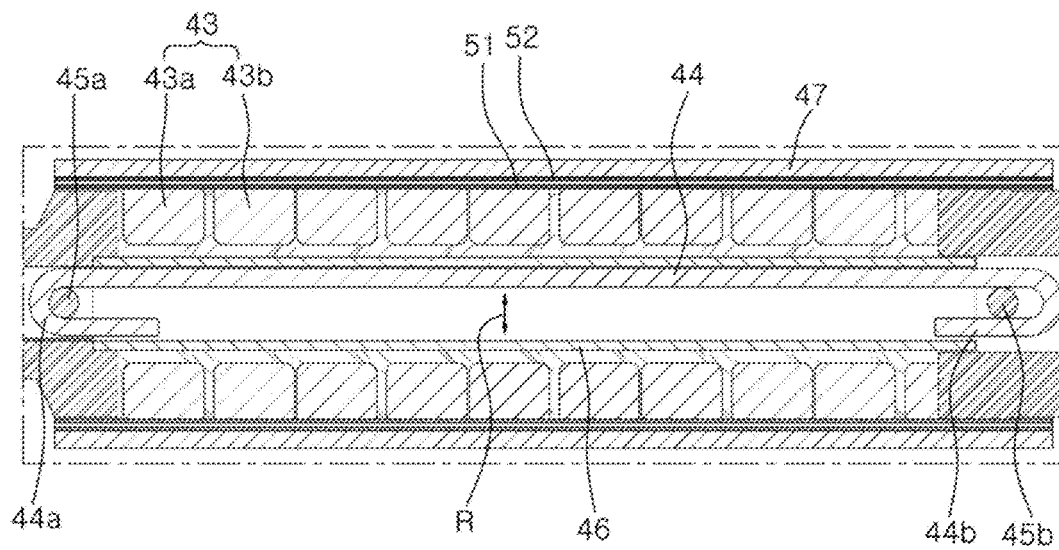
[FIG 5]
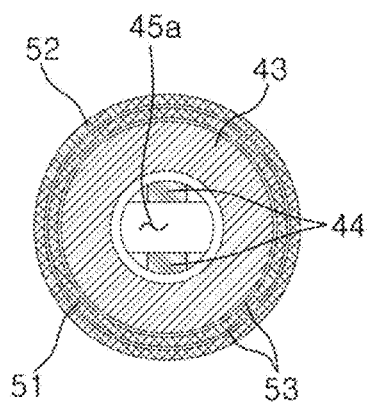

[FIG 6]
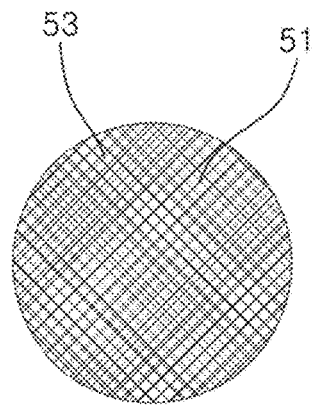
[FIG 7]
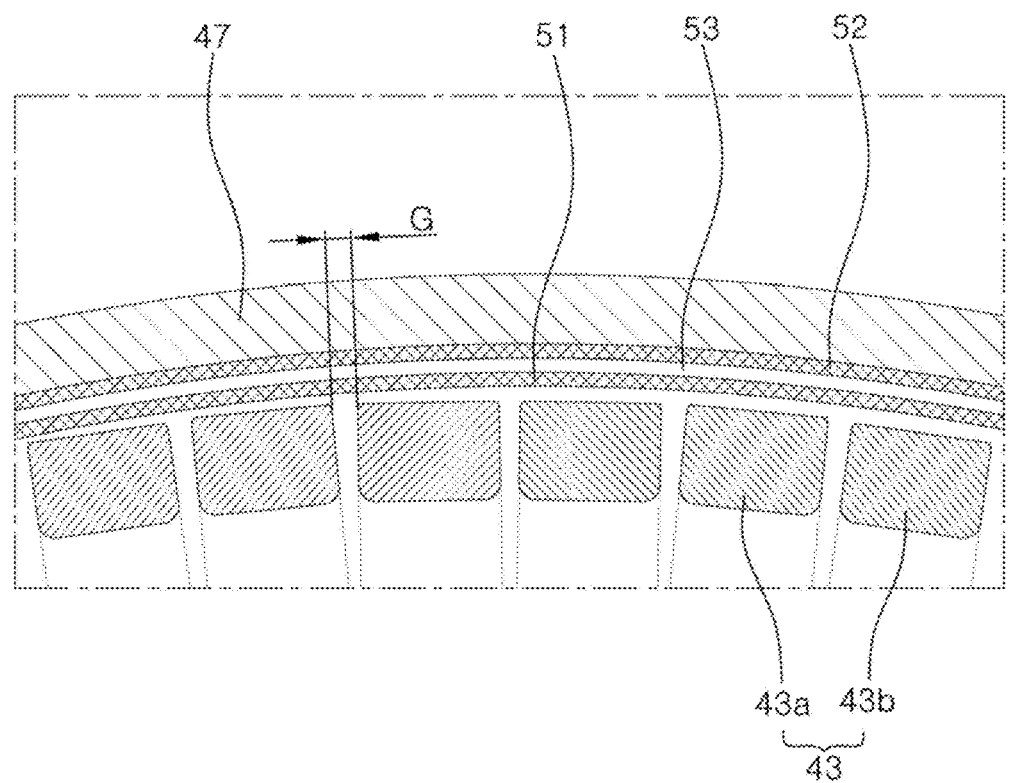

FLEXIBLE TIG WELDING TORCH

CROSS-REFERENCE TO RELATED APPLICATIONS

This application claims the benefit of Republic of Korea Patent Application 10-2020-0012913 (filed 4 Feb. 2020), the entire disclosure of which is hereby incorporated by reference herein.

BACKGROUND OF THE INVENTION

1. Field of the Invention

The present invention relates to an improved flexible TIG welding torch and more particularly, to a flexible TIG welding torch improved to prevent a local deformation and a local deformation fatigue failure formed in a complexed spiral wire and a clad body by multi-layer protective sleeves, and stably maintain a complexed wire arrangement within a flexible connection portion of the torch body, even when repeated bending deformations occur to a torch body during welding process.

2. Description of the Related Art

Unless expressed otherwise in the specification herein, the content described in this section is not prior art for claims of the present application, and the content is not acknowledged as the prior art even though included in this section.

It is well known that a TIG welding uses heat formed by generating an arc between a tungsten electrode or electrode rod and an object to be welded in an inert gas atmosphere such as argon or helium, and the arc and welding portion are blocked from air, so that the ductility, strength, airtightness, and corrosion resistance of a welded portion is excellent, metal oxides are generated less, and impurities are mixed less.

A general TIG welding torch includes a torch head for TIG welding to fix a tungsten electrode, a torch handle having a trigger switch, and a torch body for connecting the torch head to the torch handle for TIG welding, in which the torch body accommodates a connection wire formed of a copper alloy to serve as an electrode.

When the torch body has a fixed linear structure, the efficiency of welding decreases and a welding posture of a worker becomes unstable in the case that a working space is narrow or a workpiece has a complexed shape, thereby increasing the risk of an accident.

As one of related art for solving the aforementioned disadvantages, a TIG welding torch having a flexible connection portion has been proposed.

FIG. 1 is a perspective view schematically showing a conventional flexible TIG welding torch. FIG. 2 is a view showing a using state of the conventional flexible TIG welding torch.

Referring to FIGS. 1 and 2, the flexible TIG welding torch in the related art has a torch head 10 and 11, a torch handle 20, and a torch body 30 for connecting the torch head 10 to the torch handle 20, in which the torch body 30 includes a spiral connection wire 32 formed of a copper alloy to serve as an electrode inside the clad body 31.

The torch handle 20 includes a gripping part 21 and a cable assembly coupled in the gripping part 21 to supply power and inert gas, and the torch body 30 is operable in a state bent in an arc shape or a state bent at a predetermined angle by a spiral connection wire 32 from a linear state for TIG welding.

In the case that a working space is narrow or a workpiece has a complexed shape during the welding process, the clad body 31 of the torch body 30 may bend the torch head 11 clockwise or counterclockwise with respect to the torch handle 20, together with the spiral connection wire 32 molded on the outer side of the clad body 31 as shown in FIG. 2, accordingly an angle of the torch head is adjusted, so that the welding efficiency may be increased, the work range may be expanded, and a dangerous posture of a worker may be avoided, thereby increasing the safety of work.

However, when the angle adjustment of the torch head is repeated for a long time, the clad body 31 and the spiral connection wire 32 are repeatedly exposed to compression moments and tensile moments.

Referring to FIG. 2, during the repeated angle adjustments of the torch head, the spiral connection wire 32 and the clad body 31 molded on an outer side thereof are repeatedly subjected to external forces P1 and P2 related to the compressions and tensions. In the above process, since a part 31a or 31b of the clad body penetrates or enters a space G between arrangements of the spiral connection wire 32, a local damage or breakage easily occurs, and the spiral connection wire is deformed into a misalignment or broken.

As one of the other related arts, the flexible TIG welding torch registered as Korean Patent Registration No. 10-1095566 is generally known.

The above technology is a flexible TIG welding torch registered as a patent as the result studied by the applicant and inventor of the present invention to improve the durability of the spiral connection wire 32, in which a collet and a ceramic cap are applied for smooth supply of inert gas and protection from arc radiant heat.

However, when the angle adjustment of the torch head is repeated for a long time, the torch body is still vulnerable to repeated bending deformations with respect to the clad body and the spiral connection wire.

PATENT DOCUMENTS

Korean Utility Model Registration No. 20-0248916 (registered on Sep. 19, 2001)

Korean Patent Registration No. 10-1095566 (registered on Dec. 12, 2011)

SUMMARY OF THE INVENTION

The present invention disclosed in the specifications herein provides a flexible TIG welding torch for preventing a local deformation and a fatigue failure due to a clad body penetrating or infiltrating between arrangements of a complexed wire, by dispersing and absorbing external forces related to compression and tension applied to a complexed spiral wire and the clad body by a multi-layer protective sleeve.

In addition, the present invention disclosed in the specifications herein provides a flexible TIG welding torch for sufficiently maintaining the durability even when an angle adjustment of a torch head is repeated for a long time, by stably maintaining a complexed wire arrangement within a flexible connection portion of a torch body.

It is obvious that the present disclosed invention is not limited to the above-described technical problems, and another technical problem may be derived from the following descriptions.

One feature of the disclosed invention is implemented by a flexible TIG welding torch having a torch body for performing an angle adjustment of a torch head with respect to a torch handle, wherein the torch body includes: a multi-array spiral wires having both ends connected to the torch head and the torch handle; a first protective sleeve supported in contact with outer sides of the wires and organized as a mesh structure; a second protective sleeve laminated as a mesh structure on an outer side of the first protective sleeve, and bonded onto an inner surface of a clad body of the torch body and an adhesive layer impregnated into the mesh structures of the first and second protective sleeves to fix the first and second protective sleeves to each other, and support compressive and tensile stresses formed in the first and second protective sleeves.

Another feature of the disclosed invention is to provide a flexible TIG welding torch having a first protective sleeve including a fiberglass crimp net.

A still another feature of the disclosed invention is to provide a flexible TIG welding torch having a second protective sleeve including a fiberglass crimp net.

A still another feature of the disclosed invention is to provide a flexible TIG welding torch further including an auxiliary support wire installed at an inner side of a guide hole formed inside multi-array spiral wires, in which the auxiliary support wire supports an arrangement of the wire.

A still another feature of the disclosed invention is to provide a flexible TIG welding torch having an auxiliary pipe provided between the inside of the multi-array spiral wires and the auxiliary support wire.

A still another feature of the disclosed invention is to provide a flexible TIG welding torch further including an auxiliary support wire formed at both ends thereof with hook portions, in which the hook portions are hooked by fixing pins, respectively.

According to the embodiments disclosed in the present specification, when an external force is applied to manipulate the angle of the torch head during TIG welding work, the compression or tensile strength formed in the clad body and the complexed spiral wire inside the clad body is dispersed and supported by the multi-layered first and second protective sleeves, so that the local deformation can be removed and the local deformation fatigue failure can be prevented.

In addition, according to the embodiments disclosed in the present specification, when the external force is applied to manipulate the angle of the torch head, complexed supporting forces are structurally generated from the outside and inside of the spiral wires by the first and second protective sleeves and the auxiliary support wire, thereby blocking a local protrusion or separation of the wires, so that the complexed wire arrangement can be stably maintained and the durability can be increased.

Since the disclosed content is exerted by the configurations of the described content irrespective of whether the inventor recognizes or not, the above-described advantageous effects are merely a few exemplary effects according to the described content, and it should not be acknowledged that all effects are identified by the inventor(s) or exist in the descriptions.

In addition, the advantageous effects of the disclosed invention should be further understood throughout the descriptions of the specification, and any effect recognizable as having such an effect through the present specification by those having ordinary skill in the art will be regarded as the advantageous effect described in the present specification even if it is not explicitly stated herein.

BRIEF DESCRIPTION OF THE DRAWINGS

The above and other objects, features, and advantages of the present invention will be more apparent from the following detailed description taken in conjunction with the accompanying drawings, in which:

FIG. 1 is a perspective view schematically showing a conventional flexible TIG welding torch.

FIG. 2 is a view showing a using state of the conventional flexible TIG welding torch.

FIG. 3 is a partial cut-out lateral sectional view of the flexible TIG welding torch according to one embodiment of the present invention.

FIG. 4 is an enlarged sectional view showing a main part of the flexible TIG welding torch shown in FIG. 3.

FIG. 5 is a sectional view taken along line A-A' of FIG. 3.

FIG. 6 is a partial enlarged view showing a mesh structure of first and second protective sleeves according to the embodiment of the present invention.

FIG. 7 is a partial sectional view showing an external force distribution by the first and second protective sleeves and a supporting action for a complexed spiral wire according to the embodiment of the present invention.

DETAILED DESCRIPTION OF THE EXEMPLARY EMBODIMENTS

Advantages and features of the present invention, and methods for achieving the advantages and features will be apparent with reference to the embodiments described below in detail with the accompanying drawings. However, the present invention is not limited to the embodiments described as below and it may be implemented in various different forms. The embodiments are provided to complete the disclosure of the present invention and clearly teach the scope of the invention to a person having ordinary skill in the art of the present invention, therefore, the present invention will be defined only by the scope of claims. The same reference numeral indicates the same element throughout the specification.

In the following description of the embodiments of the present invention, the detailed description of known functions and configurations incorporated herein will be omitted when it possibly makes the subject matter of the present invention unclear unnecessarily. In addition, the terms described later are terms defined by taking into consideration of functions in the embodiments of the present invention, and may vary according to a user's or operator's intention or practice. Therefore, the definition shall be made based on the contents throughout the specification herein.

FIG. 1 is a perspective view schematically showing a conventional flexible TIG welding torch. FIG. 2 is a view showing a using state of the conventional flexible TIG welding torch. FIG. 3 is a partial cut-out lateral sectional view of the flexible TIG welding torch according to one embodiment of the present invention. FIG. 4 is an enlarged sectional view showing a main part of the flexible TIG welding torch shown in FIG. 3. FIG. 5 is a sectional view taken along line A-A' of FIG. 3. FIG. 6 is a partial enlarged view showing a mesh structure of first and second protective sleeves according to the embodiment of the present invention. FIG. 7 is a partial sectional view showing an external force distribution by the first and second protective sleeves and a supporting action for a complexed spiral wire according to the embodiment of the present invention.

Referring to FIGS. 3 and 4, the present invention according to one embodiment is applied to a flexible TIG welding torch having a torch body 40 for performing an angle adjustment of a torch head 10 with respect to a torch handle 20.

The torch body 40 includes an approximately cylindrical clad body 47, and the clad body 47 is formed of elastic silicone or rubber molding.

More specifically, the torch body 40 includes multi-array complexed spiral wires 43 and having both ends connected to the torch head 10 and the torch handle 20.

The complexed spiral wires 43 may be composed of two rows of complexed spiral wires concentrically adjacent to each other. According to various embodiments, various stiffness and electrical conductivities suitable for working conditions may be applied by modifying the complexed spiral wire so as to be formed of three or more rows of wound wires to correspond to a current and a voltage previously designed in consideration of arc heat to a welding base material.

The operational principle is the same as in the related art in which the above-described complexed spiral wire 43 is typically applied as a negative electrode during the TIG welding work and the workpiece is applied as a positive electrode to generate an arc between the tungsten welding rod and a workpiece, therefore, the detailed description will be omitted.

FIG. 4 is an enlarged sectional view showing a main part of the flexible TIG welding torch shown in FIG. 3. FIG. 5 is a sectional view taken along line A-A' of FIG. 3. FIG. 6 is a partial enlarged view showing a mesh structure of first and second protective sleeves according to the embodiment of the present invention.

Referring to FIGS. 4 and 5, a torch body 40 according to one embodiment includes a first protective sleeve 51 supported in contact with outsides of the inner wires 43 and organized as a mesh structure.

In addition, the torch body 40 includes a second protective sleeve 52 laminated as a mesh structure on an outer side of the first protective sleeve 51, and bonded onto an inner surface of the clad body 47 of the torch body 40.

As shown in FIG. 6, the first protective sleeve 51 has a mesh structure for distributing and supporting a stress generated by an external force when an angle of the torch head is adjusted.

Likewise, the second protective sleeve 52 has a mesh structure for distributing and supporting the stress generated by the external force when the angle of the torch head is adjusted.

Preferably, the first protective sleeve 51 may be formed of a fiberglass crimp net having a mesh structure, and mesh factors of the fiberglass crimp net may be constrained or fixed by an adhesive layer 53 to disperse and support the external force.

More preferably, the second protective sleeve 52 may be formed of a glass fiber crimping net having a mesh structure, and mesh factors of the fiberglass crimp net may be constrained or fixed by the adhesive layer 53 to disperse and support the external force, and maintain the inner surface flatness of the clad body 47 with respect to local compressive stress and tensile stress.

Referring to FIG. 7, when the angle of the torch head in a horizontal state is required to be adjusted to have an arc shape with respect to the torch handle at a work site, the worker applies an external force in a clockwise or counterclockwise direction when viewed form the drawing. In this process, the clad body 47 in a horizontal state is bent in a predetermined arc shape and subjected to compression and tension, and the complexed spiral wires 43 (43a and 43b) are bent.

The first protective sleeve 51 having the mesh structure supports a defamation generated when the complexed spiral wire 43 (43a and 43b) is bent. Simultaneously, the second protective sleeve 52 laminated on the first protective sleeve 52 having the mesh structure absorbs and disperses a bending deformation, that is, compressive stress and tensile stress occurring on the inner surface of the clad body 47.

Even when the first and second sleeves 51 and 52 are bent in an arc shape, the inner surface of the clad body 47 maintains a good surface flatness corresponding to the arc shape by the sleeve contact structure, and as a result, the inside of the clad body 47 is protected without penetrating or digging into a gap G formed between the complexed spiral wires 43 (43a and 43b).

More specifically, even when the complexed wires 43 bent in the clockwise or counterclockwise direction are spaced apart from each other or form the gap G in the process of adjusting the angle of the torch head, the inside of the clad body 47 maintains the flatness by the first and second protective sleeves 51 and 52 without generating a local deformation portion, thereby preventing a fatigue failure of the clad body 47.

According to one embodiment, the torch body 40 includes an adhesive layer 53 impregnated into the mesh structure of each of the first and second protective sleeves 51 and 52 to fix the first and second protective sleeves 51 and 52 to each other, and the adhesive layer 53 supports compressive and tensile stresses formed in the first and second protective sleeves 51 and 52.

Meanwhile, an auxiliary support wire 44 is configured at an inner side of a guide hole formed inside the multiple-row spiral wires 43, and the auxiliary support wire 44 elastically supports the arrangement of the wires 43.

More preferably, the auxiliary support wire 44 has hook portions 44a and 44b at both ends thereof, and the hook portions 44a and 44b are hooked and fixed by fixing pins 45a and 45b, respectively.

The auxiliary support wire 44 provides an elastic support force inside the wires 43 in a radial direction to prevent the complexed wires from being misarranged in the process of adjusting the angle of the torch head.

For example, when the wires 43 are curved or bent in an arc shape by the external force in the clockwise or counterclockwise direction in the drawing during adjusting the angle of the torch head, the elastic force of the auxiliary support wire 44 acts in the radial direction R from the inside of the wires 43, and the wires 43 maintain an arc-shaped complexed wire arrangement without partial separation, derailment, or protrusion.

Meanwhile, according to one embodiment of the disclosed invention, an auxiliary pipe 46 may be interposed between the inside of the multi-array spiral wires 43 and the auxiliary support wire 44, and the stiffness of the auxiliary pipe 46 may be added to the elastic force of the auxiliary support wire 44, so that the wires 43 act as a supporting force for blocking the separation of the complexed wire arrangements.

According to another embodiment, when thee clad body 47 is compressed and molded, the auxiliary pipe 46 may be configured to prevent a molding member, such as silicon or rubber, from penetrating into a space inside the complexed spiral wire 43.

As described above, when the external force is applied to manipulate the angle of the torch head for work efficiency and safety in the welding process, the compressive or tensile force formed in the clad body and the complexed spiral wire inside the clad body is supported by the multi-layered first and second protective sleeves, so that the local deformation fatigue failure may be prevented without the local deformation.

In addition, complexed supporting forces are structurally generated from the outside and inside of the wires by the first and second protective sleeves and the auxiliary support wire, thereby blocking the local protrusion or separation of the spiral wires, so that the complexed wire arrangement may be stably maintained.

Although the exemplary embodiments of the present invention has been described with reference to the accompanying drawings, the embodiments described herein and the configurations shown in the drawings are merely preferred embodiments according to the present invention, and do not represent all of the technical ideas of the present invention. Accordingly, it should be understood that various equivalents and modifications may be substituted therefor at the time of filing of the present application. Therefore, the above described embodiments should be understood in all respects as illustrative and not restrictive, the scope of the invention is indicated by the following claims rather than the above detailed descriptions, and all deformations or modifications derived from the idea and scope of the claims and their equivalents should be construed as being included in the scope of the present invention.

What is claimed is:

1. A flexible TIG welding torch comprising a torch body for performing an angle adjustment of a torch head with respect to a torch handle, wherein the torch body comprises:
   a multi-array complexed spiral wires having both ends connected to the torch head and the torch handle;
   a first protective sleeve supported in contact with outer sides of the wires and organized as a mesh structure;
   a second protective sleeve laminated as a mesh structure on an outer side of the first protective sleeve, and bonded onto an inner surface of a clad body of the torch body; and
   an adhesive layer impregnated into the mesh structures of the first and second protective sleeves to fix the first and second protective sleeves to each other and support compressive and tensile stresses formed in the first and second protective sleeves.

2. The flexible TIG welding torch of claim 1, wherein the first protective sleeve includes a fiberglass crimp net.

3. The flexible TIG welding torch of claim 1, wherein the second protective sleeve includes a fiberglass crimp net.

4. The flexible TIG welding torch of claim 1, further comprising:
   an auxiliary support wire installed at an inner side of a guide hole formed inside the multi-array complexed spiral wires, wherein
   the auxiliary support wire supports an arrangement of the multi-array complexed spiral wires.

5. The flexible TIG welding torch of claim 4, further comprising:
   an auxiliary pipe provided between the inside of the wire and the auxiliary support wire.

6. The flexible TIG welding torch of claim 4, wherein the auxiliary support wire is formed at both ends thereof with hook portions, and the hook portions are hooked by fixing pins, respectively.

7. The flexible TIG welding torch of claim 2, wherein the second protective sleeve includes a fiberglass crimp net.

8. The flexible TIG welding torch of claim 2, further comprising:
   an auxiliary support wire installed at an inner side of a guide hole formed inside the multi-array complexed spiral wires, wherein
   the auxiliary support wire supports an arrangement of the multi-array complexed spiral wires.

9. The flexible TIG welding torch of claim 8, further comprising:
   an auxiliary pipe provided between the inside of the wire and the auxiliary support wire.

10. The flexible TIG welding torch of claim 8, wherein the auxiliary support wire is formed at both ends thereof with hook portions, and the hook portions are hooked by fixing pins, respectively.

* * * * *